Jan. 10, 1939.　　　　L. L. KIME　　　　2,143,780
CLEANING METHOD AND APPLIANCE FOR COFFEE-BREWING PERCOLATOR VESSELS
Filed Oct. 4, 1935
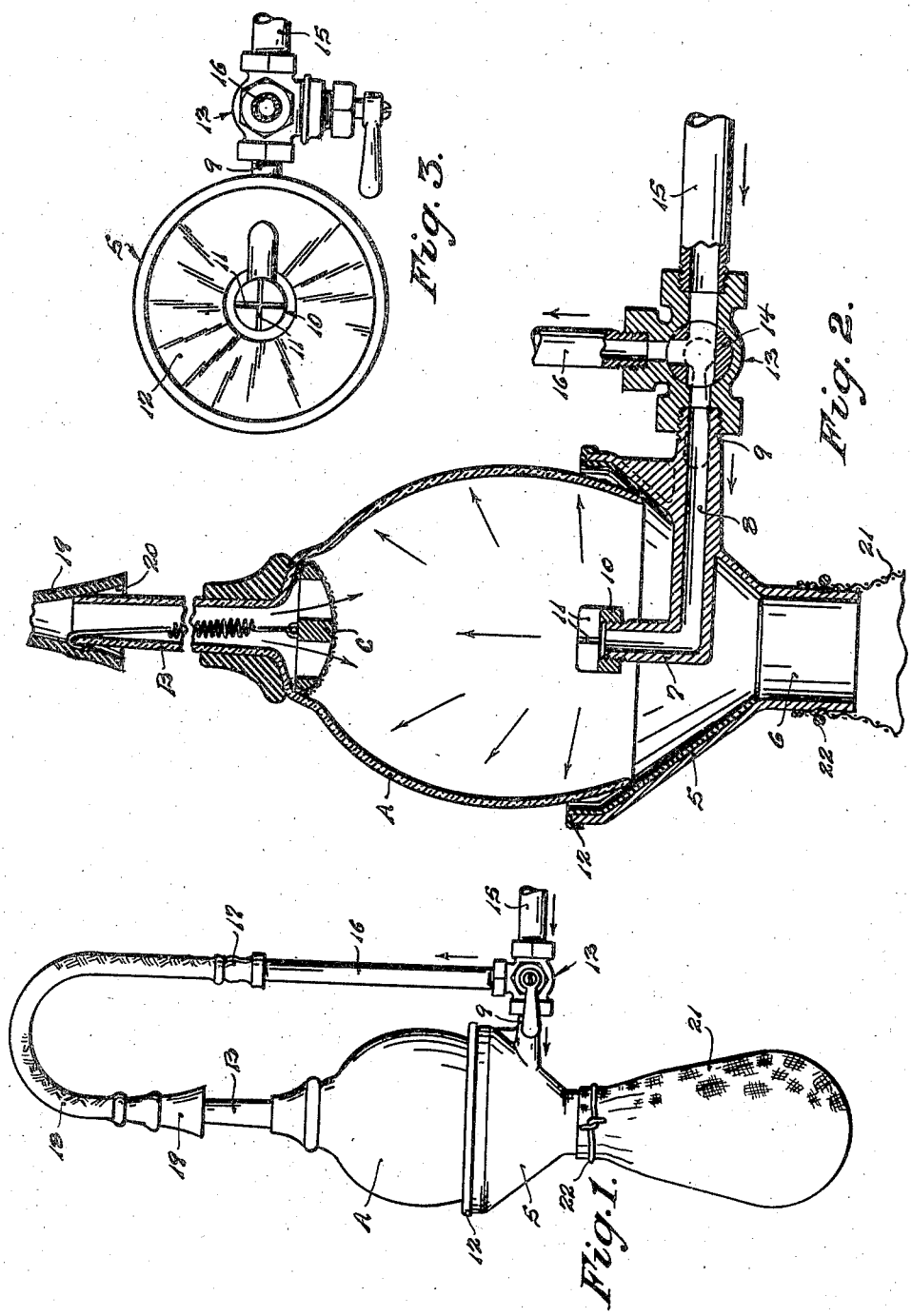
INVENTOR
Leslie L. Kime
BY
ATTORNEY Patented Jan. 10, 1939

2,143,780

UNITED STATES PATENT OFFICE 2,143,780

CLEANING METHOD AND APPLIANCE FOR COFFEE-BREWING PERCOLATOR VESSELS

Leslie L. Kime, Seattle, Wash.

Application October 4, 1935, Serial No. 43,553

9 Claims. (Cl. 141—1)

This invention relates to a cleaning device for that class of uni-filter coffee-brewing appliances in which water is forced from a heated receptacle under the influence of steam pressure into a percolator vessel located above the receptacle and within which coffee grains are inserted, the brew returning to the lower receptacle through a filtering cloth following removal of the appliance from the source of heat. In this character of coffee-brewing appliance the coffee grains are introduced over the filtering cloth and difficulty is had in removing the grounds which adhere to the cloth. It is the object of the present invention to provide an especially efficient cleaning device which will overcome this objection.

The foregoing, together with further and more particular objects and advantages, will become apparent in the course of the following detailed description taken in connection with the drawing and in the claims thereto annexed, the invention consisting in the novel construction, adaptation, and combination of parts hereinafter described and claimed.

In the drawing:

Figure 1 is a side elevational view representing the invention in its now preferred form and indicating the application of the same in cleaning a percolator vessel of the character with which the present invention is particularly designed for use.

Fig. 2 is a longitudinal vertical section thereof with parts broken away and arrows used to represent the direction of water flow, the view being taken to an enlarged scale; and Fig. 3 is a top plan view of the device, the hose and related connections for delivering a descending flow of water through the percolator vessel not being shown and the pipe leading thereto being indicated in horizontal section.

Before proceeding with a detailed description of the invention, it is believed advantageous to refer more in detail to the character of coffee-brewing appliance with which the invention is intended for use. Most generally referred to as a "Silex" coffee-maker and conventionally produced from glass, the lower receptacle provides a service neck in which the upper or percolator vessel is adapted to be fitted, said percolator vessel being formed with an open bell-shaped chamber A arranged to lie above the receptacle and providing a hollow stem B which extends through the service neck into proximity to the receptacle floor. A rubber gasket for sealing the service neck against the escape of steam is fitted over the stem. An apertured block member C over which the straining cloth is received seats against the inner wall of the shoulder lying between the stem and chamber and is retained in position by a resilient connection extending through the stem and hooked over the lower edge. Following a brewing operation, the practice heretofore has been to dislodge the hook, extract the block, and remove and clean the straining cloth which is provided with a drawstring to enable the same to be applied over the block. Particularly in restaurants, the breakage during cleaning is especially high and it is to enable the operator to effectively clean the percolator vessel and related parts without the necessity of removing the latter that the present invention is devised.

The body of my cleaning device is designed to form a basin, indicated in the drawing by the numeral 5, which desirably flares upwardly and provides at the lower end an outlet orifice 6. Said body is or may be formed as a casting and disposed axially within the same to extend upwardly into proximity to the upper limits of the basin is a threaded spout 7 which is fed from a conduit 8 leading through the wall of the body from a threaded lateral nipple 9, said spout receiving a spray head 10 which, as indicated, is provided with diametrical slits 11 extending at cross angles to one another. Received over the inner surface of the basin is a cushion-forming rubber lining 12.

Fitting said nipple with one opening from the same communicating with the conduit 8, I provide a valve body 13 formed with a cylindrical valve chamber in which, desirably, a rotary three-way valve 14 is received, the other two openings from said valve body connecting with a delivery pipe 15 leading from a pressure source of water supply and a pipe 16 projecting upwardly and provided at its upper end with a fitting 17 adapted to be coupled with a hose 18. Carried on the outlet end of said hose is a flexible rubber tip 19 the walls of which define a cuplike thimble depression 20.

In what is believed an obvious manner, the operator inverts the percolator vessel, inserts the end of the stem B within the thimble-forming tip of the hose, introduces the bell-shaped head A in the basin to seat against the rubber lining 12, and opens the valve to the position shown in the several views of the drawing. Pressure streams of water delivered from pipe 16 through the stem of the vessel are projected through the foraminous strainer cloth, with a simultaneous spray being delivered from the head 10 over the inner walls of the vessel and against the underside of the cloth. It is particularly advantageous that the strainer cloth be lifted from the surface of the perforated block member C to clear the cloth of coffee grounds adhering to such portions of the cloth as overlie the solid ribs of the block, as well as slightly elevating the block from its seat to afford access to the space about the edges of the block. The invention performs this end in a particularly advantageous manner in that the spray from the head 10 is distributed over substantially the entire surface area of the vessel while the stream from the hose 18 is concentrated upon the under or seating side of the block, developed pressure differential favoring the hose-delivered jet. Where insufficient pressure is available in the source of water supply to efficiently distribute the water in the manner described, the operator may initially open the valve to connect pipes 15 and 16, following this with the delivery of a spray through the head 10.

The invention further provides a porous sack 21 fitting over the neck of the body about the outlet orifice to prevent the dislodged coffee grounds from being discharged into the sink with the danger of clogging the sink outlet, the sack being detachably supported in any suitable manner as by a wire clamp 22.

Either cold or hot water may be advantageously employed, the latter being preferable for cutting the oil of coffee adhering to the walls of the vessel.

Modifications of the invention will readily suggest themselves and it is my intention that the claims be given a breadth in their construction commensurate with the scope of the invention within the art.

What I claim is:

1. The method of cleaning coffee grounds from a percolator vessel characterized by the provision of an open chamber and a hollow stem arranged in brew-filtering discharge relation thereto which consists in the steps of inverting the vessel and projecting opposing pressure streams of a fluid cleaning agent into said chamber from the stem end and from the opposite open end of the vessel simultaneously.

2. The method by which coffee grounds are removed from a percolator vessel characterized by the provision of an open chamber for brewing purposes and a hollow stem arranged in brew-filtering discharge relation thereto, said method consisting in inverting the vessel to have the stem lie above the chamber, delivering a pressure spray of water into the chamber from the lower open end of the chamber, and simultaneously delivering a pressure stream of water into the chamber from the upper stem end of the vessel.

3. The method by which coffee grounds are removed from a percolator vessel characterized by the provision of an open coffee-brewing chamber having a hollow stem extending therefrom and arranged in brew-filtering discharge relation to the chamber, consisting in inverting the vessel to have the stem lie above the chamber, directing a pressure spray of water through the lower open end of the inverted vessel to distribute the spray over substantially the entire inner wall surface of the chamber, simultaneously directing a concentrated pressure column of water through the invertedly located stem to deliver the same through the interstices of the filter into the chamber, and screening the water run-off to trap the coffee grounds carried therewith.

4. The method by which coffee grounds are removed from a percolator vessel characterized by the provision of an open coffee-brewing chamber having a hollow stem extending therefrom and arranged in brew-filtering discharge relation to the chamber, consisting in delivering a liquid cleaning agent under pressure and from opposite ends of the vessel into the chamber while positioning the vessel in a manner to obtain a gravity run-off of the dislodged coffee grounds, the cleaning agent being employed as the carrier, from the open end of the chamber.

5. An appliance for use in cleaning an inverted percolator vessel of the character described providing an open coffee-brewing chamber and a hollow stem leading therefrom with a strainer supported at the junction of the chamber and the stem, the appliance comprising the combination of a spray head having water-supply connections leading thereto and operating to deliver a distributed stream of water to substantially the entire inner wall surface of an inverted vessel positioned over the same, and an associated water-jet device providing a rubber tip arranged to detachably engage the stem of an inverted vessel so positioned, the water-jet device having water-supply connections leading to said tip, for projecting a concentrated column of water from the stem of the vessel through the interstices of the strainer into said open coffee-brewing chamber.

6. An appliance for use in cleaning a percolator bowl of the described character providing an open coffee-brewing chamber having a brew-discharging hollow stem leading therefrom, the appliance comprising, in combination with a stand over which the bowl is adapted to be invertedly received, said stand providing a water outlet by which a water stream is sprayed over the inner wall surface of the invertedly received bowl, a flexible hose located to extend over the inverted bowl, and means comprised of a rubber tip carried by the hose permitting detachable connection as between the bowl stem and the hose, both the stand and the hose providing connections for coupling the same to a pressure source of water supply.

7. An appliance for use in the removal of coffee grounds from a coffee-brewing vessel characterized by the provision of an open chamber having a brew-discharging hollow stem leading therefrom, said appliance comprising a stand over which the vessel is arranged to be invertedly disposed, the stand having means by which water is sprayed upwardly into the inverted bowl and providing an outlet opening accommodating a gravity run-off of the coffee grounds, an upper water-jet device formed with means arranged to engage the stem of the inverted vessel and enabling water to be forced downwardly into the chamber through the vessel's stem, a porous sack arranged to fit over the outlet opening from the stand, and a clamp for detachably connecting said sack over said opening in a position to trap coffee grounds delivered through the opening.

8. An appliance for use in cleaning an inverted percolator vessel of the character described providing an open coffee-brewing chamber and a hollow stem leading therefrom and provided with a strainer at the junction of the chamber and the stem, the appliance comprising the combination of a spray head having water-supply connections leading thereto and operating to deliver a distributed stream of water upwardly into the inverted bowl, and an upper water-jet device, having a water-supply connection leading thereto, formed with means arranged to engage the stem of the inverted vessel for projecting a concentrated column of water from the stem of the vessel through the interstices of the strainer into said open coffee-brewing chamber.

9. The method by which coffee grounds are removed from a percolator vessel of the character providing an open coffee-brewing chamber and a hollow stem leading therefrom and provided with brew-filtering means at the junction of the chamber and the stem, said method consisting in delivering a liquid cleaning agent over the inner wall of the chamber from the open end of the same to dislodge the grounds from said inner wall, and dislodging grounds from the brew-filtering means by projecting a pressure column of water through the stem into the chamber.

LESLIE L. KIME.